US012672215B2

(12) United States Patent
Chien

(10) Patent No.: US 12,672,215 B2
(45) Date of Patent: Jun. 30, 2026

(54) COLOR CALIBRATION CIRCUIT AND METHOD APPLIED TO BACKLIGHT SOURCE IN LIQUID CRYSTAL DISPLAY MODULE

(71) Applicant: PowerView Display Corporation, Hsinchu County (TW)

(72) Inventor: Cheng-Pang Chien, Hsinchu County (TW)

(73) Assignee: POWERVIEW DISPLAY CORPORATION, Hsinchu County (TW)

( * ) Notice: Subject to any disclaimer, the term of this patent is extended or adjusted under 35 U.S.C. 154(b) by 57 days.

(21) Appl. No.: 18/810,580

(22) Filed: Aug. 21, 2024

(65) Prior Publication Data

US 2026/0059624 A1 Feb. 26, 2026

(51) Int. Cl.
| | |
|---|---|
| *H05B 45/22* | (2020.01) |
| *G02F 1/1335* | (2006.01) |
| *G02F 1/13357* | (2006.01) |

(52) U.S. Cl.
CPC ....... *H05B 45/22* (2020.01); *G02F 1/133608* (2013.01); *G02F 1/133621* (2013.01); *G02F 1/133628* (2021.01)

(58) Field of Classification Search
CPC . H05B 45/22; H05B 45/327; G02F 1/133628; G02F 1/133608; G02F 1/133621; G09G 3/3426; G09G 3/3611; G09G 3/342; G09G 3/3413; G09G 3/3406
See application file for complete search history.

(56) References Cited

U.S. PATENT DOCUMENTS

| | | | | |
|---|---|---|---|---|
| 2003/0076056 A1* | 4/2003 | Schuurmans | .......... | H05B 45/22 |
| | | | | 315/149 |
| 2003/0230991 A1* | 12/2003 | Muthu | ................. | G09G 3/3413 |
| | | | | 315/307 |
| 2007/0091055 A1* | 4/2007 | Sakuda | ................. | G09G 3/3611 |
| | | | | 345/102 |
| 2007/0159851 A1* | 7/2007 | Lee | ...................... | G09G 3/3426 |
| | | | | 362/613 |
| 2007/0262732 A1* | 11/2007 | Shen | .................... | H05B 45/327 |
| | | | | 315/312 |
| 2007/0285378 A1* | 12/2007 | Lankhorst | .............. | G09G 3/342 |
| | | | | 345/102 |
| 2008/0174544 A1* | 7/2008 | Ueda | .................... | G09G 3/3426 |
| | | | | 315/324 |
| 2013/0088522 A1* | 4/2013 | Gettemy | .............. | G09G 3/3406 |
| | | | | 345/102 |
| 2016/0302282 A1* | 10/2016 | Ooghe | ................. | G09G 3/3413 |

FOREIGN PATENT DOCUMENTS

JP 2012018809 A * 1/2012

* cited by examiner

*Primary Examiner* — Richard J Hong
(74) *Attorney, Agent, or Firm* — WPAT, PC

(57) ABSTRACT

A color calibration circuit and a calibration method for a backlight source of a liquid crystal display module are provided. The backlight source is an RGB backlight source. When the calibration method is performed, the controller receives three color light intensity signals from a light sensor, and three updated driving currents are calculated. Then, the controller provides the driving currents to the backlight source. Consequently, the red light beam, the green light beam, and the blue light beam emitted by the backlight source are mixed as a white light beam, and the white light beam is not subjected to color variation.

11 Claims, 3 Drawing Sheets

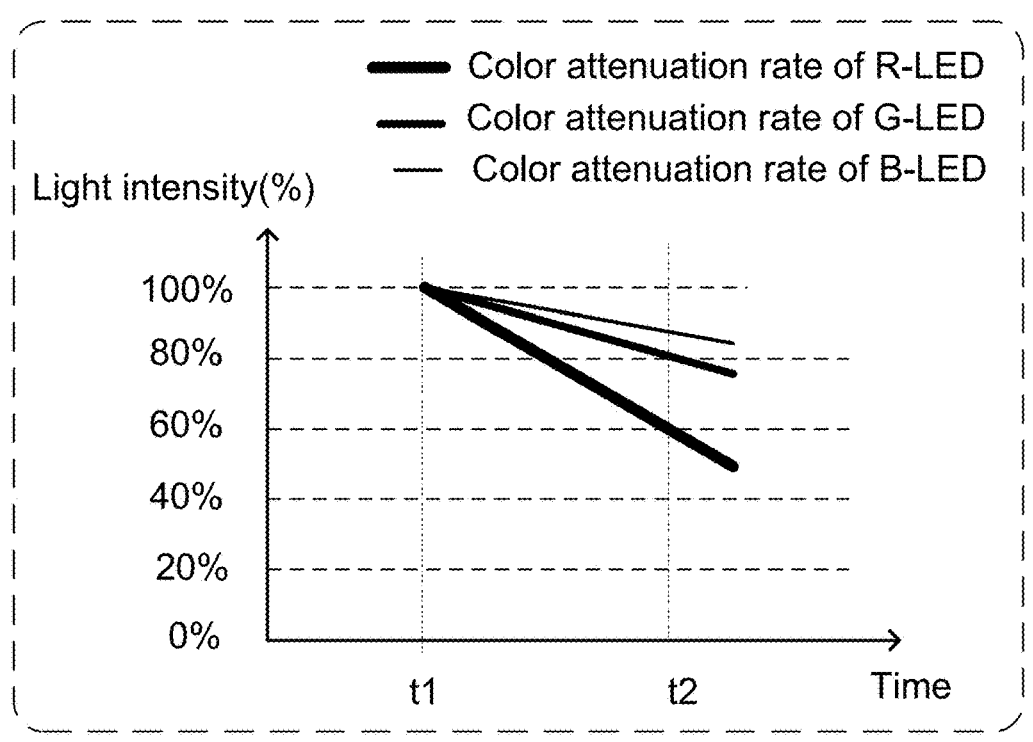
FIG. 1
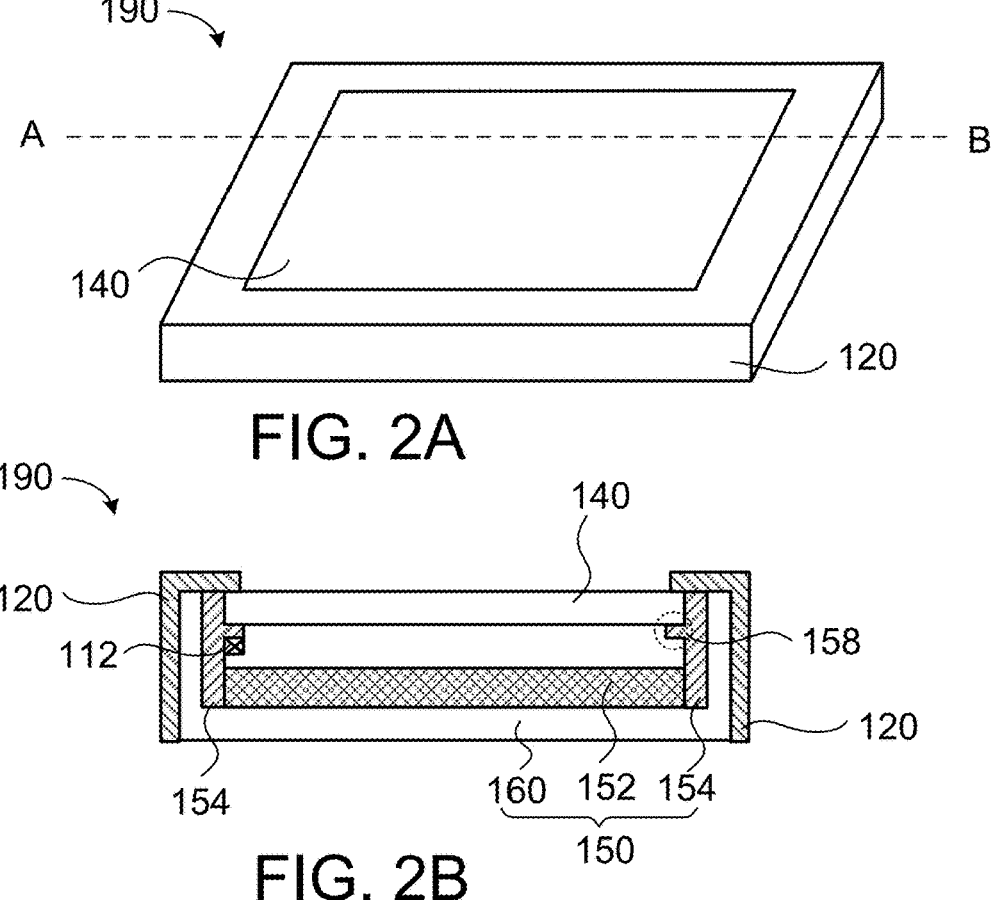
FIG. 2A
FIG. 2B

COLOR CALIBRATION CIRCUIT AND METHOD APPLIED TO BACKLIGHT SOURCE IN LIQUID CRYSTAL DISPLAY MODULE

FIELD OF THE INVENTION

The present invention relates to a calibration circuit and a calibration method, and more particularly to a color calibration circuit and a calibration method applied to a backlight source in a liquid crystal display module.

BACKGROUND OF THE INVENTION

As known, many electronic products are equipped with display devices. The display device usually includes a liquid crystal display module. The liquid crystal display module includes an LCD panel and a backlight unit. When a backlight source in the backlight unit emits a white light beam to the LCD panel, specified colors in the white light beam can be filtered by plural pixels in the LCD panel. Consequently, a specified image can be displayed on the LCD panel.

Generally, in the backlight unit, the white light beam from the backlight source is emitted by a white lamp tube. Alternatively, the white light beam from the backlight source is emitted by plural white light-emitting diodes. Recently, a backlight source with plural red light-emitting diodes, plural green light-emitting diodes and plural blue light-emitting diodes in an array arrangement is introduced into the market. This type of backlight source is referred to as an RGB backlight source. The RGB backlight source can emit a red light beam, a green light beam, and a blue light beam simultaneously. The red light beam, the green light beam, and the blue light beam are mixed as the white light beam.

SUMMARY OF THE INVENTION

An embodiment of the present invention provides a color calibration circuit for a liquid crystal display module. The color calibration circuit includes a backlight source, a light sensor, and a controller. The backlight source includes plural first color light-emitting diodes, plural second color light-emitting diodes, and plural third color light-emitting diodes. The plural first color light-emitting diodes, the plural second color light-emitting diodes, and the plural third color light-emitting diodes are arranged in an array structure. The light sensor is located beside the backlight source. The controller is electrically connected with the backlight source and the light sensor. When the controller performs a calibration method, the controller receives a first color light intensity signal, a second color light intensity signal, and a third color light intensity signal, and the controller calculates a first updated driving current, a second updated driving current, and a third updated driving current. The controller provides the first updated driving current to the plural first color light-emitting diodes, provides the second updated driving current to the plural second color light-emitting diodes, and provides the third updated driving current to the plural third color light-emitting diodes.

Another embodiment of the present invention provides a calibration method for the color calibration circuit. The calibration method is implemented in a normal operating process of the liquid crystal display module. The calibration method includes the following steps. In a step (a), the first color light intensity signal, the second color light intensity signal, and the third color light intensity signal are received.

In a step (b), the first updated driving current, the second updated driving current, and the third updated driving current are calculated according to the first color light intensity signal, the second color light intensity signal, and the third color light intensity signal. In a step (c), the first updated driving current is provided to the plural first color light-emitting diodes, the second updated driving current is provided to the plural second color light-emitting diodes, and the third updated driving current is provided to the plural third color light-emitting diodes.

Another embodiment of the present invention provides a calibration method for the color calibration circuit. The calibration method is implemented in a start-up procedure of the liquid crystal display module. The calibration method includes the following steps. In a step (a), a first predetermined driving current is provided to the plural first color light-emitting diodes, and the first color intensity signal is received. In a step (b), a second predetermined driving current is provided to the plural second color light-emitting diodes, and the second color intensity signal is received. In a step (c), a third predetermined driving current is provided to the plural third color light-emitting diodes, and the third color intensity signal is received. In a step (d), the first updated driving current, the second updated driving current, and the third updated driving current are provided according to the first color light intensity signal, the second color light intensity signal, and the third color light intensity signal. After a start-up procedure of the liquid crystal display module is completed and the liquid crystal display module is operated normally, the first updated driving current, the second updated driving current, and the third updated driving current are respectively provided to the plural first color light-emitting diodes, the plural second color light-emitting diodes and the plural third color light-emitting diodes simultaneously.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 1 is a plot illustrating the light attenuation changes of a red light-emitting diode, a green light-emitting diode, and a blue light-emitting diode;

FIG. 2A is a schematic perspective view illustrating a display module according to an embodiment of the present invention;

FIG. 2B is a schematic cross-sectional view illustrating the structure of the display module shown in FIG. 2A and taken along the line AB;

DETAILED DESCRIPTION OF PREFERRED EMBODIMENTS

Figure 3A:
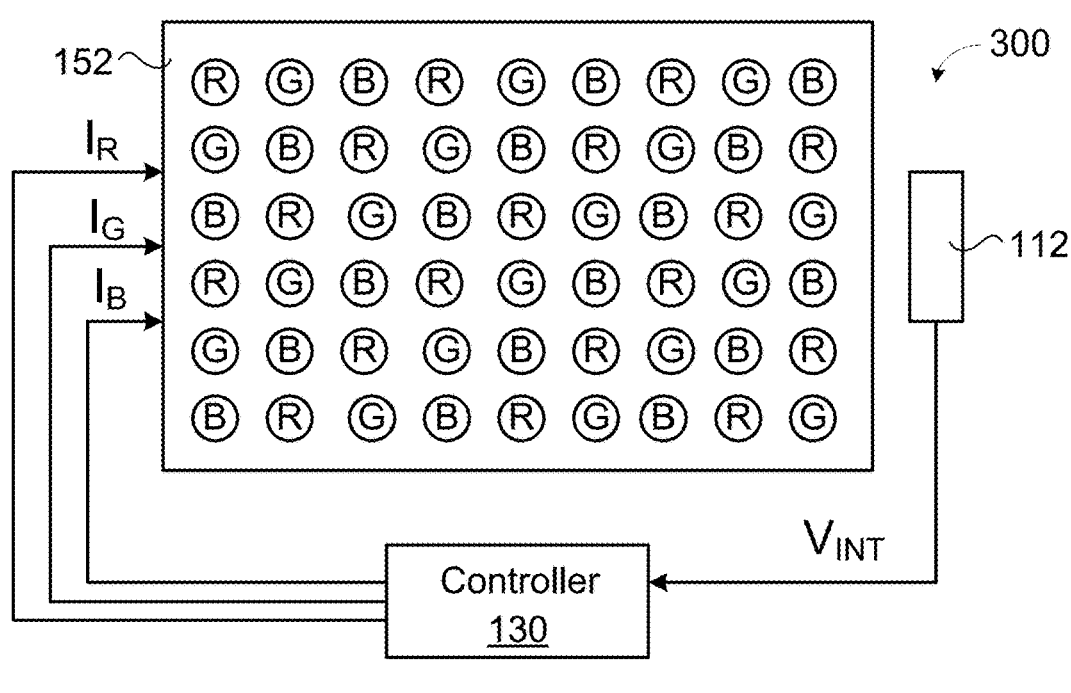
FIG. 3A is a schematic circuit diagram illustrating a color calibration circuit according to a first embodiment of the present invention.

FIG. 1 is a plot illustrating the light attenuation changes of a red light-emitting diode, a green light-emitting diode, and a blue light-emitting diode. For example, at the time point t1, the liquid crystal display module has just been produced. In addition, a driving current $I_R$ is provided to a red light-emitting diode (R-LED), a driving current $I_G$ is provided to a green light-emitting diode (G-LED), and a driving current $I_B$ to a blue light-emitting diode (B-LED). Meanwhile, the light intensity of each of the red light-emitting diode (R-LED), the green light-emitting diode (G-LED), and the blue light-emitting diode (B-LED) reaches 100%. In other words, the light intensity ratio of the red light beam, the green light beam, and the blue light beam is a specified ratio (e.g., 1:1:1). Under this circumstance, the white light beam emitted by the backlight source has no color variation. In addition, the driving currents $I_R$, $I_G$, and $I_B$ can be regarded as predetermined driving currents.

Generally, the light attenuation rates of the red light-emitting diode (R-LED), the green light-emitting diode (G-LED), and the blue light-emitting diode (B-LED) are different. The light intensity is decreased with increasing time. For example, at the time point t2 (e.g., two years after the light-emitting diodes are produced), the light intensity of the red light-emitting diode (R-LED) drops to about 60% in response to the same predetermined driving current $I_R$, the light intensity of the green light-emitting diode (G-LED) drops to about 80% in response to the same predetermined driving current $I_G$, and the light intensity of the blue light-emitting diode (B-LED) drops to about 90% in response to the same predetermined driving current $I_G$.

That is, if the three predetermined driving currents $I_R$, $I_G$, and $I_B$ have not been adjusted after the backlight source has been used for a long time, the light intensity ratio of the red light beam, the green light beam, and the blue light beam is not the specified ratio (e.g., 1:1:1). Consequently, the white color of the mixed light beam is subjected to color variation.

In order to overcome the color variation problem of the backlight source, the present invention provides a color calibration circuit applied to the backlight source in a liquid crystal display module.

FIG. 2A is a schematic perspective view illustrating a display module according to an embodiment of the present invention. FIG. 2B is a schematic cross-sectional view illustrating the structure of the display module shown in FIG. 2A and taken along the line AB.

The display module 190 includes a front cover 120, a backlight unit 150, an LCD panel 140, and a light sensor 112. The front cover 120 is a metal front cover. The backlight unit 150 includes a heat sink 160, a backlight source 152, and a frame 154. The frame 154 is a plastic frame. The sidewall of the backlight source 152 is surrounded by the frame 154.

Please refer to FIG. 2B. In the backlight unit 150, the frame 154 is in contact with the inner sidewall of the heat sink 160. The backlight source 152 is in contact with a bottom surface of a concave structure of the heat sink 160. Furthermore, the frame 154 includes a supporting part 158. The LCD panel 140 is placed on the supporting part 158 of the frame 154. The backlight source 152 is arranged between the bottom side of the supporting part 158 and the bottom surface of the concave structure of the heat sink 160. In other words, the bottom side and the lateral sides of the backlight source 152 are respectively surrounded by the heat sink 160 and the frame 154. Consequently, the light beam emitted by the backlight unit 150 can only be projected to the outside of the display module 100 through the LCD panel 140.

A top surface of the front cover 120 is located over the heat sink 160, the frame 154, and the LCD panel 140. In addition, the lateral sides of the front cover 120 are in contact with the outer sidewall of the heat sink 160. The top surface of the front cover 120 has a hollow portion. A display region of the LCD panel 140 is exposed to the hollow portion of the front cover 120. Consequently, when the LCD panel 140 is operated normally, the image displayed on the display region of the LCD panel 140 can be normally viewed.

In this embodiment, the backlight source 152 includes plural red light-emitting diodes, plural green light-emitting diodes, and plural blue light-emitting diodes, which are arranged in an array structure. In other words, the backlight source 152 of the liquid crystal display module 190 is an RGB backlight source. Furthermore, the light sensor 112 is disposed of in an accommodation space between the LCD panel 140 and the backlight source 152. For example, the light sensor 112 is located under the supporting part 158 to detect the light intensity of the light beam emitted by the backlight source 152. The liquid crystal display module 190 further includes a controller (not shown). The controller is electrically connected to the backlight source 152 and the light sensor 112. In addition, the controller, the backlight source 152, and the light sensor 112 are collaboratively formed as a color calibration circuit for the backlight source 152 of the liquid crystal display module 190. The present invention further includes a calibration method for the color calibration circuit. The operations of the color calibration circuit and the calibration method are described in detail below.

Figure 3B:
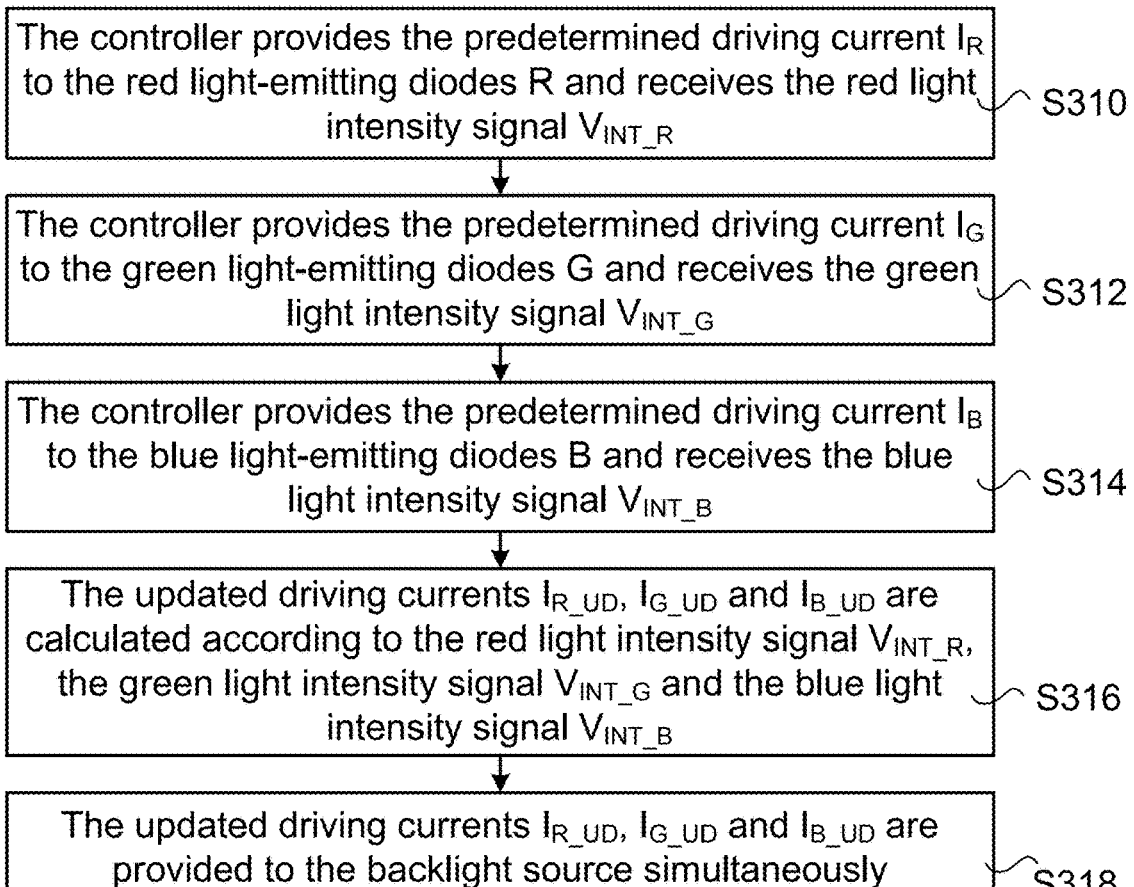
FIG. 3B is a flowchart of a calibration method for the color calibration circuit shown in FIG. 3A.

FIG. 3A is a schematic circuit diagram illustrating a color calibration circuit according to a first embodiment of the present invention. FIG. 3B is a flowchart of a calibration method for the color calibration circuit shown in FIG. 3A.

The color calibration circuit 300 includes the backlight source 152, the light sensor 112, and a controller 130. The controller 130 is located outside the liquid crystal display module 190 and is electrically connected with the backlight source 152 and the light sensor 112 through a flexible flat cable.

As shown in FIG. 3A, the backlight source 152 includes plural red light-emitting diodes R, plural green light-emitting diodes G, and plural blue light-emitting diodes B, which are arranged in an array structure. In other words, the backlight source 152 is an RGB backlight source. The controller 130 provides predetermined driving currents IR, IG, and IB to drive the red light-emitting diodes R, the green light-emitting diode G, and the blue light-emitting diode B of the backlight source 152. Consequently, the red light-emitting diodes R, the green light-emitting diodes G, and the blue light-emitting diodes B generate a red light beam, a green light beam, and a blue light beam.

The light sensor 112 is located near the backlight source 152. In addition, the light sensor 112 generates a light intensity signal $V_{INT}$ to the controller. For illustration, the light intensity signal $V_{INT}$ for the red light beam is referred to as a red light intensity signal $V_{INT\_R}$, the light intensity signal $V_{INT}$ for the green light beam is a green light intensity signal $V_{INT\_G}$, and the light intensity signal $V_{INT}$ for the blue light beam is referred as a blue light intensity signal $V_{INT\_B}$.

After the liquid crystal display module 190 is powered on, the controller 130 performs a start-up procedure. After the start-up procedure is completed, the liquid crystal display module 190 is operated normally. The calibration method of this embodiment can be applied to the start-up procedure duration of the liquid crystal display module 190.

Please refer to FIG. 3B. Firstly, the controller 130 provides the predetermined driving current $I_R$ to the red light-emitting diodes R of the backlight source 152, and the light sensor 112 generates the corresponding red light intensity signal $V_{INT\_R}$ to the controller 130 (Step S310).

Then, the controller 130 then provides the predetermined driving current $I_G$ to the green light-emitting diodes G of the backlight source 152, and the light sensor 112 generates the corresponding green light intensity signal $V_{INT\_G}$ to the controller 130 (Step S312).

Then, the controller 130 then provides the predetermined driving current $I_B$ to the blue light-emitting diodes B of the backlight source 152, and the light sensor 112 generates the corresponding red light intensity signal $V_{INT\_B}$ to the controller 130 (Step S314).

Then, the controller 130 calculates the updated driving currents $I_{R\_UD}$, $I_{G\_UD}$, and $I_{B\_UD}$ according to the red light intensity signal $V_{INT\_R}$, the green light intensity signal $V_{INT\_G}$, and the blue light intensity signal $V_{INT\_B}$ (step S316). And, the controller 130 provides the updated driving currents $I_{R\_UD}$, $I_{G\_UD}$, and $I_{B\_UD}$ to the backlight source 152 simultaneously (Step S318).

As mentioned above, in the start-up procedure of the liquid crystal display module 190, the controller 130 provides plural driving currents to detect plural monochromatic light intensity signals sequentially. That is, the light intensity signal corresponding to a monochromatic light beam is emitted each time. After the three monochromatic light intensity signals $V_{INT\_R}$, $V_{INT\_G}$, and $V_{INT\_B}$ are received by the controller 130, the controller calculates the three updated driving currents $I_{R\_UD}$, $I_{G\_UD}$, and $I_{B\_UD}$. Consequently, after the start-up procedure is completed and the liquid crystal display module 190 is operated normally, the controller 130 provides the updated driving currents $I_{R\_UD}$, $I_{G\_UD}$, and $I_{B\_UD}$ to the backlight source 152 simultaneously. Consequently, the red light beam, the green light beam, and the blue light beam emitted by the backlight source 152 are mixed as a white light beam, and the white light beam is not subjected to color variation.

A method of calculating the updated driving currents $I_{R\_UD}$, $I_{G\_UD}$ and $I_{B\_UD}$ will be described as follows. For example, after the liquid crystal display module 190 has just been produced, the predetermined driving current $I_R$, the predetermined driving current $I_G$, and the predetermined driving current $I_B$ are provided to the backlight source 152. In response to the predetermined driving current $I_R$, the light intensity signal corresponding to the red light beam emitted by the red light-emitting diodes R is 100. In response to the predetermined driving current $I_G$, the light intensity signal corresponding to the green light beam emitted by the green light-emitting diodes G is 100. In response to the predetermined driving current $I_B$, the light intensity signal corresponding to the blue light beam emitted by the blue light-emitting diodes B is 100. The value "100" may be regarded as the predetermined light intensity signal. In other words, the light intensity ratio of the red light beam, the green light beam, and the blue light beam is a specified ratio (e.g., 1:1:1). Under this circumstance, the white light beam emitted by the backlight source 152 has no color variation.

After a long use time, the red light-emitting diodes R, the green light-emitting diodes G, and the blue light-emitting diodes B have a color attenuation problem. That is, even if the controller 130 provides the predetermined driving currents $I_R$, $I_G$, and $I_B$ to the backlight source 152, the light intensity signal corresponding to the red light beam emitted by the red light-emitting diodes R, the light intensity signal corresponding to the green light beam emitted by the green light-emitting diodes G and the light intensity signal corresponding to the blue light beam emitted by the blue light-emitting diodes B are longer equal to 100. Under this circumstance, the light intensity ratio of the red light beam, the green light beam, and the blue light beam is not the specified ratio (e.g., 1:1:1). Consequently, the white color of the mixed light beam is subjected to color variation. An example of calibrating the light intensity of the red light beam from the red light-emitting diodes R will be described as follows.

After liquid crystal display module 190 is powered on and the controller 130 performs the start-up procedure, the controller 130 performs the calibration method of the first embodiment. In case that the controller 130 provides the predetermined driving current $I_R$ to the red light-emitting diodes R, the red light intensity signal $V_{INT\_R}$ generated by the light sensor 112 drops (e.g., drops from 100 to 80) because of the color attenuation problem of the red light-emitting diodes R) after the backlight source has been used for a long time.

For allowing the red light-emitting diodes R to emit the red light beam with the light intensity of 100, the controller 130 calculates a compensated driving current $I_{\Delta R}$ for the red light-emitting diodes R. That is, $I_{\Delta R}=[(100-80)/100]\times I_R$. For example, the controller 130 calculates the compensated driving current $I_{\Delta R}$ according to the predetermined light intensity signal and the red light intensity signal $V_{INT\_R}$.

Furthermore, the controller 130 calculates the updated driving current $I_{R\_UD}$ according to the predetermined driving current $I_R$ and the compensated driving current $I_{\Delta R}$. That is, $I_{R\_UD}=I_R+I_{\Delta R}$. After calibration, the updated driving current $I_{R\_UD}$ is provided to the green light-emitting diodes G, and the light intensity signal corresponding to the green light beam emitted by the green light-emitting diodes G is 100.

Similarly, the controller 130 calculates the compensated driving current $I_{\Delta G}$ and the updated driving current $I_{G\_UD}$. Similarly, the controller 130 calculates the compensated driving current $I_{\Delta B}$ and the updated driving current $I_{B\_UD}$. Generally, the red light-emitting diode R, the green light-emitting diode G, and the blue light-emitting diode B have different extents of color attenuation. In fact, the compensated driving current $I_{\Delta R}$, the compensated driving current $I_{\Delta G}$, and the compensated driving current $I_{\Delta B}$ may be different.

It is noted that numerous modifications and alterations may be made while retaining the teachings of the invention. In order to achieve the power-saving purpose, it is not necessary to modify the compensated driving currents $I_{\Delta R}$, $I_{\Delta G}$, and $I_{\Delta B}$. For example, in a variant example, the two lowest light intensity signals corresponding to the red light-emitting diode R, the green light-emitting diode G, and the blue light-emitting diode B are compensated. Even if the red light beam, the green light beam, and the blue light beam from the red light-emitting diode R, the green light-emitting diode G, and the blue light-emitting diode B have the light intensities lower than the predetermined light intensities, the light intensity ratio of the red light beam, the green light beam and the blue light beam is maintained in the specified ratio (e.g., 1:1:1).

The light attenuation changes may be seen in FIG. 1. For example, the calibration method is performed at the time point t2. Meanwhile, the red light intensity signal $V_{INT\_R}$ corresponding to the red light-emitting diode R is 60, the green light intensity signal $V_{INT\_G}$ corresponding to the green light-emitting diode G is 80, and the blue light intensity signal $V_{INT\_B}$ corresponding to the blue light-emitting diode B is 90. In an embodiment, the controller 130 sets the compensated driving current $I_{AB}$ to 0. The compensated driving current $I_{AR}$ is calculated according to the red light intensity signal $V_{INT\_R}$, wherein the red light intensity signal $V_{INT\_R}$ is set to 90. That is, $I_{AR}=[(90-60)/90]\times I_R$. The compensated driving current $I_{AG}$ is calculated according to the red light intensity signal $V_{INT\_G}$, wherein the red light intensity signal $V_{INT\_G}$ is set to 90. That is, $I_{AG}=[(90-80)/90]\times I_G$.

In the above implementation example, the updated driving current $I_{B\_UD}$ is equal to the predetermined driving current $I_B$, and the $I_{R\_UD}$ and $I_{G\_UD}$ are modified. After the controller 130 provides the updated driving currents $I_{R\_UD}$, $I_{G\_UD}$, and $I_{B\_UD}$ to the backlight source 152, the three light intensity signals $V_{INT\_R}$, $V_{INT\_G}$, and $V_{INT\_B}$ are still maintained in the specified ratio (e.g., 1:1:1). In other words, the white light beam from the backlight source 152 is not subjected to the color variation.

It is noted that the methods of calculating the updated driving currents $I_{R\_UD}$, $I_{G\_UD}$, and $I_{B\_UD}$ are not restricted. That is, the methods of calculating the updated driving currents $I_{R\_UD}$, $I_{G\_UD}$, and $I_{B\_UD}$ may be varied according to the practical requirements.

The above calibration method is applied to the start-up procedure of the liquid crystal display module 190. However, if the liquid crystal display module 190 is operated 24 hours a day without interruption, the above calibration method is not feasible.

Figure 4A:
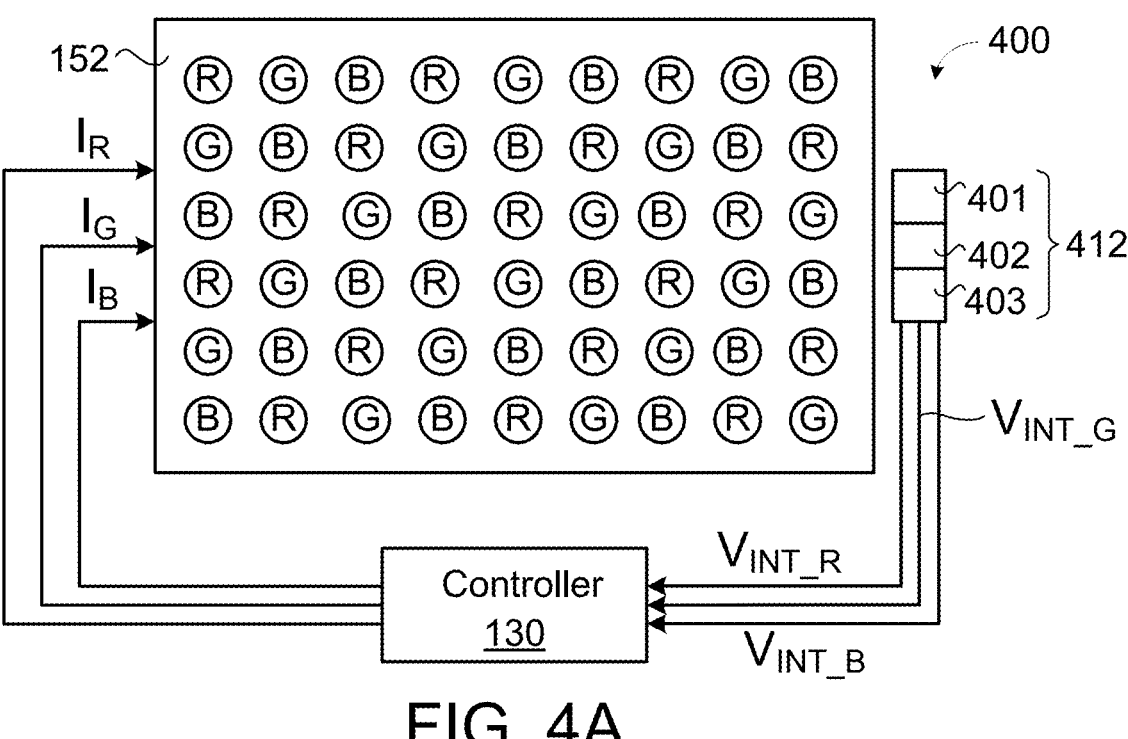
FIG. 4A is a schematic circuit diagram illustrating a color calibration circuit according to a second embodiment of the present invention.
Figure 4B:
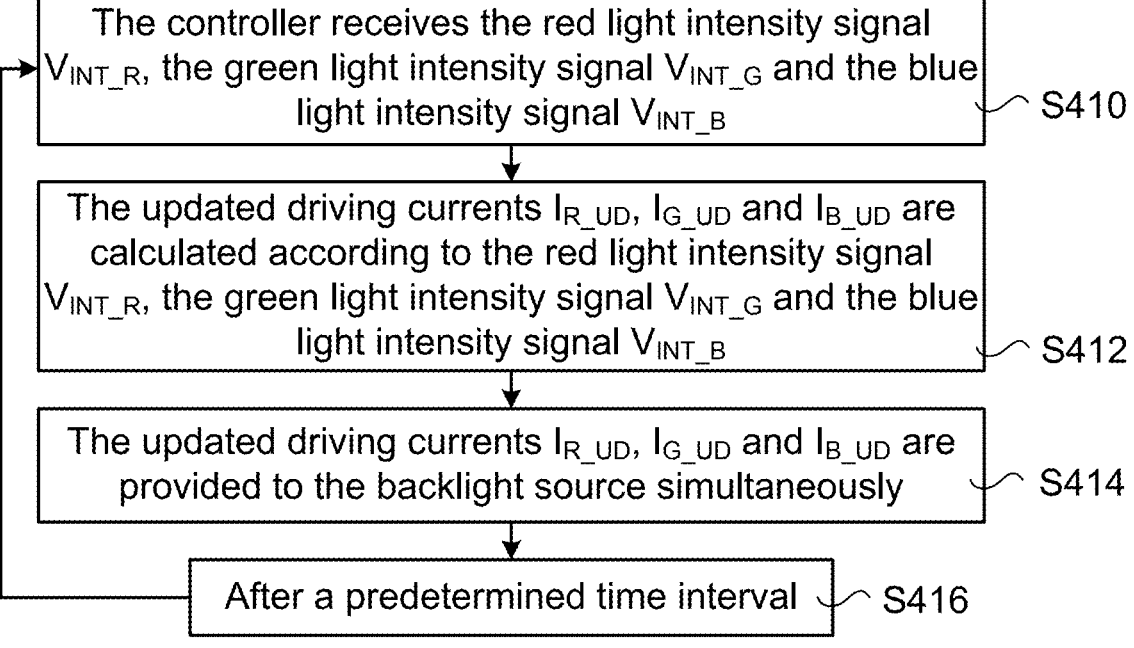
FIG. 4B is a flowchart of a calibration method for the color calibration circuit shown in FIG. 4A.

FIG. 4A is a schematic circuit diagram illustrating a color calibration circuit according to a second embodiment of the present invention. FIG. 4B is a flowchart of a calibration method for the color calibration circuit shown in FIG. 4A. In comparison with the color calibration circuit 300 of the first embodiment, the structure of the light sensor 412 in the color calibration circuit 400 of this embodiment is distinguished.

In the color calibration circuit 400, the light sensor 412 includes three light sensing elements 401, 402, and 403. The light sensing element 401 detects the red light beam and generates a corresponding red light intensity signal $V_{INT\_R}$ to the controller 130. The light sensing element 402 detects the green light beam and generates a corresponding green light intensity signal $V_{INT\_G}$ to the controller 130. The light sensing element 403 detects the blue light beam and generates a corresponding blue light intensity signal $V_{INT\_B}$ to the controller 130. That is, the three light sensing elements 401, 402, and 403 in the light sensor 412 detect the light intensity of the red light beam, the light intensity of the green light beam, and the light intensity of the blue light beam, respectively. For example, the light sensing element 401 includes a red color filter, and thus the light sensing element 401 generates the red light intensity signal $V_{INT\_R}$. Similarly, the light sensing element 402 includes a green color filter, and thus the light sensing element 402 generates the green light intensity signal $V_{INT\_G}$. Similarly, the light sensing element 403 includes a blue color filter, and thus the light sensing element 403 generates the blue light intensity signal $V_{INT\_B}$. Since the light sensor 412 includes three light sensing elements 401, 402, and 403, the calibration process can be performed at a specified time interval (e.g., one day). Even if the start-up procedure of the liquid crystal display module 190 is not performed, the calibration method of this embodiment is feasible.

As shown in FIG. 4B, the calibration method can be performed when the liquid crystal display module 190 is operated normally. The calibration method of this embodiment will be described as follows.

In a step S410, the controller 130 receives the red light intensity signal $V_{INT\_R}$ from the light sensing element 401, receives the green light intensity signal $V_{INT\_G}$ from the light sensing element 402, and receives the blue light intensity signal $V_{INT\_B}$ from the light sensing element 403.

Then, the controller 130 calculates the updated driving currents $I_{R\_UD}$, $I_{G\_UD}$, and $I_{B\_UD}$ according to the red light intensity signal $V_{INT\_R}$, the green light intensity signal $V_{INT\_G}$ and the blue light intensity signal $V_{INT\_B}$ (step S412), and the controller 130 provides the updated driving currents $I_{R\_UD}$, $I_{G\_UD}$, and $I_{B\_UD}$ to the backlight source 152 simultaneously (Step S414).

After a predetermined time interval (Step S416), the calibration process is performed again. That is, the step S410 is repeatedly done.

The method of calculating the updated driving currents $I_{R\_UD}$, $I_{G\_UD}$, and $I_{B\_UD}$ may be referred to as the method of the first embodiment. Alternatively, the methods of calculating the updated driving currents $I_{R\_UD}$, $I_{G\_UD}$, and $I_{B\_UD}$ may be varied according to the practical requirements.

In this embodiment, the controller 130 can perform the calibration method during the normal operating process of the liquid crystal display module 190. The controller 130 receives the light intensity signals corresponding to three monochromatic light beams and calculates three updated driving currents $I_{R\_UD}$, $I_{G\_UD}$, and $I_{B\_UD}$. After the controller 130 provides the updated driving currents $I_{R\_UD}$, $I_{G\_UD}$, and $I_{B\_UD}$ to the backlight source 152, the backlight source 152 emits the red light beam, the green light beam, and the blue light beam. Under this circumstance, the three light intensity signals are still maintained in the specified ratio (e.g., 1:1:1). In other words, the white light beam from the backlight source 152 is not subjected to the color variation.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A color calibration circuit for a liquid crystal display module, the color calibration circuit comprising:

a backlight source comprising plural first color light-emitting diodes for emitting a first monochromatic light beam, plural second color light-emitting diodes for emitting a second monochromatic light beam, and plural third color light-emitting diodes for emitting a third monochromatic light beam, wherein the plural first color light-emitting diodes, the plural second color light-emitting diodes and the plural third color light-emitting diodes are arranged in an array structure;

a light sensor located beside the backlight source; and a controller electrically connected to the backlight source and the light sensor, wherein when the controller performs a calibration method, the controller receives a first color light intensity signal representing a first color light intensity of the first monochromatic light beam, a second color light intensity signal representing a second color light intensity of the second monochromatic light beam, and a third color light intensity signal representing a third color light intensity of the third monochromatic light beam, and the controller calculates a first updated driving current according to the first color light intensity signal, calculates a second updated driving current according to the second color light intensity signal, and calculates a third updated driving current according to the third color light intensity signal, wherein the controller provides the first updated driving current to the plural first color light-emitting diodes, provides the second updated driving current to the plural second color light-emitting diodes, and provides the third updated driving current to the plural third color light-emitting diodes, wherein the first monochromatic light beam, the second monochromatic light beam, and the third monochromatic light beam are mixed as a white light beam not subjected to color variation when the plural first color light-emitting diodes arranged in the array structure are driven by the first updated driving current, the plural second color light-emitting diodes arranged in the array structure are driven by the second updated driving current, and the plural third color light-emitting diodes ranged in the array structure are driven by the third updated driving current.

2. The color calibration circuit as claimed in claim 1, wherein the liquid crystal display module comprises:

a backlight unit comprising the backlight source, a heat sink, and a frame, wherein the frame comprises a supporting part, a lateral side of the backlight source is surrounded by the frame, the backlight source is in contact with a surface of the heat sink, and the frame is in contact with an inner sidewall of the heat sink;

an LCD panel disposed on the supporting part of the frame;

a front cover covering a top side of the heat sink and a top side of the frame, wherein a lateral side of the front cover is in contact with an outer sidewall of the heat sink, a hollow portion is formed in the front cover, and the LCD panel is exposed to the hollow portion; and the light sensor disposed within a space between the LCD panel and the backlight source.

3. The color calibration circuit as claimed in claim 2, wherein the light sensor is located under the supporting part.

4. The color calibration circuit as claimed in claim 1, wherein the light sensor comprises:

a first light sensing element, configured for detecting the first color light intensity and generating the first color light intensity signal;

a second light sensing element, configured for detecting the second color light intensity and generating the second color light intensity signal; and a third light sensing element, configured for detecting the third color light intensity and generating the third color light intensity signal.

5. A calibration method for the color calibration circuit according to claim 4, the calibration method being implemented in a normal operating process of the liquid crystal display module, the calibration method comprising steps of:

(a) receiving the first color light intensity signal from the first light sensing element, receiving the second color light intensity signal from the second light sensing element, and receiving the third color light intensity signal from the third light sensing element;

(b) calculating the first updated driving current according to the first color light intensity signal, calculating the second updated driving current according to the second color light intensity signal, and calculating the third updated driving current according to the third color light intensity signal; and (c) providing the first updated driving current to the plural first color light-emitting diodes, providing the second updated driving current to the plural second color light-emitting diodes, and providing the third updated driving current to the plural third color light-emitting diodes.

6. The calibration method as claimed in claim 5, wherein after a predetermined time interval, the step (a) is performed again.

7. The calibration method as claimed in claim 5, wherein the step (b) comprises sub-steps of:

(b1) calculating a first compensated driving current according to a first difference between a predetermined first color intensity signal and the first color light intensity signal;

(b2) adding a first predetermined driving current to the first compensated driving current, so that the first updated driving current is obtained;

(b3) calculating a second compensated driving current according to a second difference between a predetermined second color intensity signal and the second color light intensity signal;

(b4) adding a second predetermined driving current to the second compensated driving current, so that the second updated driving current is obtained;

(b5) calculating a third compensated driving current according to a third difference between a predetermined third color intensity signal and the third color light intensity signal; and (b6) adding a third predetermined driving current to the third compensated driving current, so that the third updated driving current is obtained.

8. The calibration method as claimed in claim 7, wherein the controller compares the first color light intensity signal, the second color light intensity signal, and the third color light intensity signal, and the controller calculates and sets current values of the first compensated driving current, the second compensated driving current, and the third compensated driving current accordingly.

9. The calibration method as claimed in claim 7, wherein one of the first compensated driving current, the second compensated driving current, and the third compensated driving current is set to 0.

10. A calibration method for the color calibration circuit according to claim 1, the calibration method being implemented in a start-up procedure of the liquid crystal display module, the calibration method comprising steps of:

(a) providing a first predetermined driving current to the plural first color light-emitting diodes, and receiving the first color intensity signal;

(b) providing a second predetermined driving current to the plural second color light-emitting diodes, and receiving the second color intensity signal;

(c) providing a third predetermined driving current to the plural third color light-emitting diodes, and receiving the third color intensity signal; and (d) calculating the first updated driving current, the second updated driving current, and the third updated driving current according to the first color light intensity signal, the second color light intensity signal, and the third color light intensity signal, wherein after the start-up procedure is completed, the liquid crystal display module is operated normally, wherein the first updated driving current is provided to the plural first color light-emitting diodes, the second updated driving current is provided to the plural second color light-emitting diodes, and the third updated driving current is provided to the plural third color light-emitting diodes simultaneously.

11. The calibration method as claimed in claim 10, wherein the step (d) comprises sub-steps of:

(d1) calculating a first compensated driving current according to a first difference between a predetermined first color intensity signal and the first color light intensity signal;

(d2) adding a first predetermined driving current to the first compensated driving current, so that the first updated driving current is obtained;

(d3) calculating a second compensated driving current according to a second difference between a predetermined second color intensity signal and the second color light intensity signal;

(d4) adding a second predetermined driving current to the second compensated driving current, so that the second updated driving current is obtained;

(d5) calculating a third compensated driving current according to a third difference between a predetermined third color intensity signal and the third color light intensity signal; and (d6) adding a third predetermined driving current to the third compensated driving current, so that the third updated driving current is obtained.

\* \* \* \* \*